(12) United States Patent
Ho

(10) Patent No.: US 11,341,226 B2
(45) Date of Patent: May 24, 2022

(54) COMBINATION LOCK SYSTEM AND METHOD OF OPERATING THE SAME

(71) Applicant: REAL LOCKS & SECURITY CO., LTD., New Taipei (TW)

(72) Inventor: Hsi-Hao Ho, New Taipei (TW)

(73) Assignee: REAL LOCKS & SECURITY CO., LTD., New Taipei (TW)

( * ) Notice: Subject to any disclaimer, the term of this patent is extended or adjusted under 35 U.S.C. 154(b) by 176 days.

(21) Appl. No.: 16/828,915

(22) Filed: Mar. 24, 2020

(65) Prior Publication Data

US 2021/0303671 A1 Sep. 30, 2021

(51) Int. Cl.
G06F 21/00 (2013.01)
G06F 21/34 (2013.01)

(52) U.S. Cl.
CPC .................................. G06F 21/34 (2013.01)

(58) Field of Classification Search
CPC ...... G06F 21/34; E05B 13/103; E05B 17/142; E05B 17/145; E05B 17/147
See application file for complete search history.

(56) References Cited

U.S. PATENT DOCUMENTS

2017/0103597 A1\* 4/2017 Fisher ................. G07C 9/00309
2018/0165441 A1\* 6/2018 Everhart ............... G06Q 20/385

FOREIGN PATENT DOCUMENTS

| CN | 105631267 A | 6/2016 |
| CN | 105976473 A | 9/2016 |
| CN | 106898064 A | 6/2017 |

OTHER PUBLICATIONS

Office Action dated Jan. 4, 2022 of the corresponding China patent application No. 202010111656.6.

\* cited by examiner

*Primary Examiner* — Joseph P Hirl
*Assistant Examiner* — Chi D Nguy
(74) *Attorney, Agent, or Firm* — Chun-Ming Shih; HDLS IPR Services

(57) ABSTRACT

A combination lock system includes a mobile communication device (10, 10'), a cloud server (20) and a combination lock (30, 30'). When the cloud server (20) determines that the mobile communication device (10, 10') matches authentication information, the cloud server (20) outputs password information (22) corresponding to the authentication information to the mobile communication device (10, 10'), and the combination lock (30, 30') obtains an electric energy and the password information (22) from the mobile communication device (10, 10'). When the combination lock (30, 30') determines that one of the characters of the password setting module (31, 31') matches one of the characters of the password information (22) corresponding to a corresponding arrangement order, the mobile communication device (10, 10') displays display information.

3 Claims, 6 Drawing Sheets

COMBINATION LOCK SYSTEM AND METHOD OF OPERATING THE SAME

BACKGROUND

Technical Field

The present disclosure relates to a combination lock system, and more particularly to a combination lock system applied to a cloud authentication and having a function of displaying whether a password is correct.

Description of Related Art

In modern life, as people's awareness of privacy and personal property rises, a combination lock is a common security tool. In the past, when you used a key to open a home door lock or a locker that is locked, it was easy to pry open and steal contents. Therefore, in order to prevent criminals, the user only needs to set the password of the combination lock according to his or her favorite number, and then the user can lock the combination lock by turning a plurality of character wheels or pressing a plurality of keys. When a password by turning the plurality of character wheels or pressing the plurality of keys matches the password set by own, the combination lock can be unlocked.

However, all the characters of the password are matched to unlock the lock. If the user cannot successfully unlock the combination lock due to forgetting the password set by own, there is no other secure and non-intrusive method (including inserting a physical key or destroying the entire combination lock) to unlock the combination lock.

For this reason, how to design a combination lock system, in particular to solve the technical problem about in prior art there is no other secure and non-intrusive method to unlock the combination lock when the password set by own is forgotten, and the technical problem about no unlocking record when unlock the combination lock. This is an important subject studied by the inventor of this present disclosure.

SUMMARY

The purpose of this disclosure is to provide a combination lock system that solves the technical problem about in prior art there is no other secure and non-intrusive method to unlock the combination lock when the password set by own is forgotten, and regardless of whether the combination lock is successfully unlocked, there has a record to achieve a purpose of convenience and enhance the safety of the combination lock.

In order to achieve the foregoing purpose, a combination lock system of the present disclosure includes a mobile communication device, a cloud server, and a combination lock. The mobile communication device stores a first authentication information and outputs a first near field communication (NFC) signal. The cloud server stores a second authentication information and a plurality of password information, and receives the first authentication information. When the cloud server determines that the first authentication information matches the second authentication information, the cloud server outputs one of the plurality of the password information corresponding to the first authentication information to the mobile communication device. The combination lock includes a password setting module that adjustable, and the combination lock obtains an electric energy and the password information from the mobile communication device through the first NFC signal. When the combination lock determines that one of characters of the password setting module matches one of characters of the password information in a corresponding arrangement order, the combination lock outputs a display information to the mobile communication device through a second NFC signal, and the mobile communication device displays the display information. When the combination lock determines that one of the characters of the password setting module does not match one of the characters of the password information in the corresponding arrangement order, the combination lock continues to determine whether one of the characters of the password setting module matches one of the characters of the password information in the corresponding arrangement order. After the combination lock obtains the password information from the mobile communication device through the first NFC signal, regardless of the combination lock determines whether the password setting module matches the password information, the combination lock outputs a combination lock record to the mobile communication device through the second NFC signal.

Further, in the combination lock system, the password setting module includes one of a plurality of letter wheels, a plurality of numeral wheels, and a plurality of buttons, or combinations thereof.

Further, in the combination lock system, the combination lock further comprising a microcontroller, a general-purpose input/output (GPIO) unit and an antenna, the microcontroller coupled to the password setting module through the GPIO unit, and obtained the power and the password information from the mobile communication device though the antenna.

Further, in the combination lock system, if the mobile communication device can wirelessly communicate with the cloud server after receiving the combination lock record, the mobile communication device outputs the combination lock record to the cloud server.

Further, in the combination lock system, if the mobile communication device cannot wirelessly communicate with the cloud server after receiving the combination lock record, the mobile communication device temporarily stores the combination lock record in a storage module within the mobile communication device until the mobile communication device determines that a wireless communication with the cloud server is possible, and then the mobile communication device outputs the combination lock record stored in the storage module to the cloud server.

Further, in the combination lock system, the combination lock record includes a time stamp, the password information, and a unique identifier corresponding to the mobile communication device.

When using the combination lock system of the present disclosure, since the mobile communication device must authenticate with the cloud server according to the first authentication information outputted, and if the first authentication information and the combination lock are matched and can be sold together, so it can ensure that it is difficult for someone to try to imitate other first authentication information or other combination locks to achieve a purpose of unlocking the combination lock. Further, when user forgets the password set by own and cannot unlock the combination lock successfully, the combination lock can be unlocked non-intrusively by the password information obtained after the mobile communication device is authenticated and the password setting module of the combination lock. If one of the characters of the password setting module of the combination lock module matches one of the characters of the password information in the corresponding arrangement order, the combination lock outputs the display information to the mobile communication device, and the mobile communication device displays the display information. In addition, regardless of whether the combination lock is successfully unlocked (regardless of whether the password setting module matches the password information), the combination lock record and outputs the combination lock record to the mobile communication device. In case of malicious trial and error or malicious unlock by someone, it can be tracked by the combination lock record.

For this reason, the combination lock system that solves the technical problem about in prior art there is no other secure and non-intrusive method to unlock the combination lock when the password set by own is forgotten, and regardless of whether the combination lock is successfully unlocked, there has a record to achieve a purpose of convenience and enhance the safety of the combination lock.

In order to further understand the techniques, means, and effects of the present disclosure for achieving the intended purpose. Please refer to the following detailed description and drawings of the present disclosure. The drawings are provided for reference and description only, and are not intended to limit the present disclosure.

DETAILED DESCRIPTION

The technical content and detailed description of the present disclosure will be described below in conjunction with the drawings.

Figure 1:
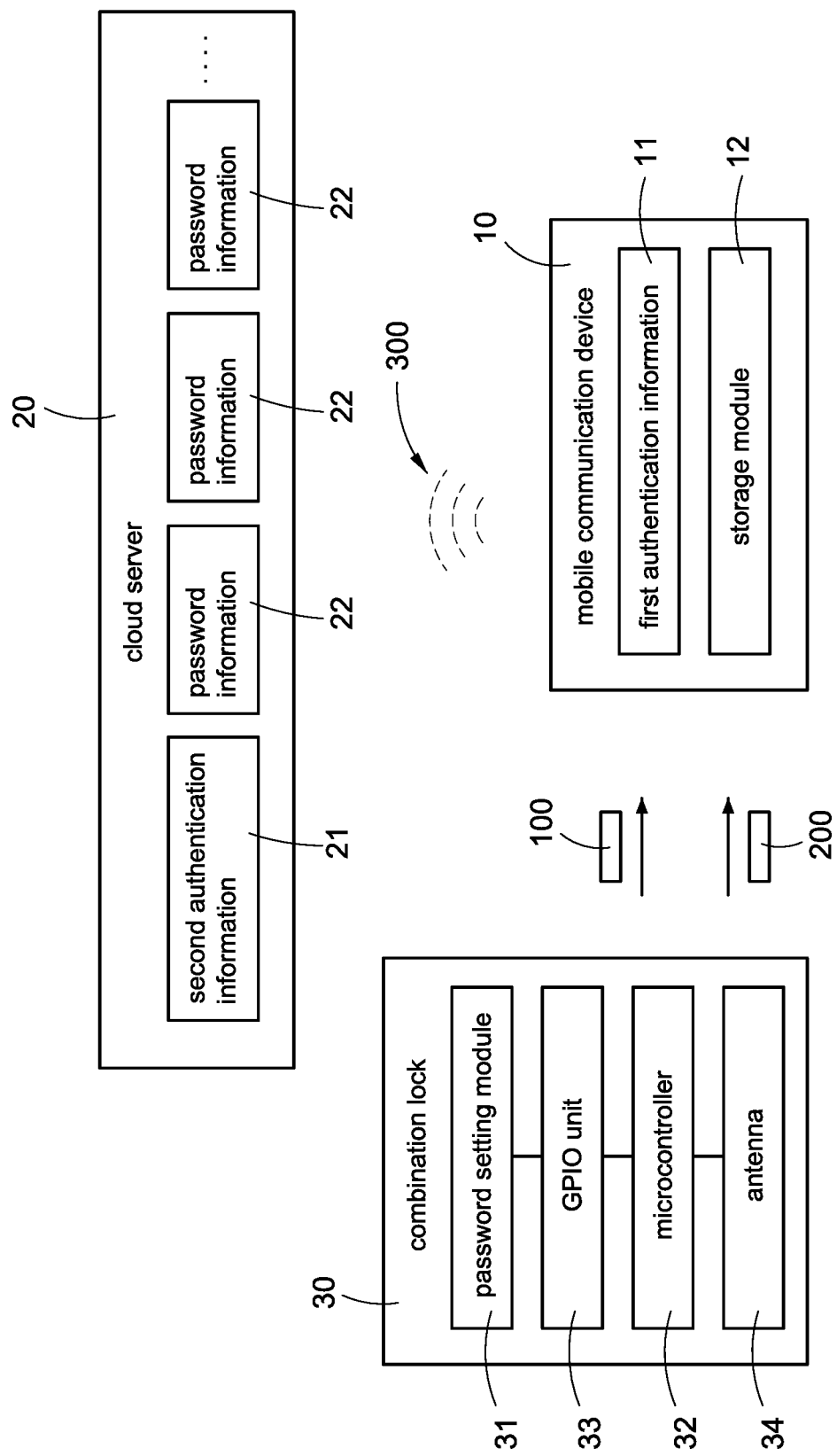
FIG. 1 is an architecture diagram of a combination lock system of the present disclosure.
Figure 2:
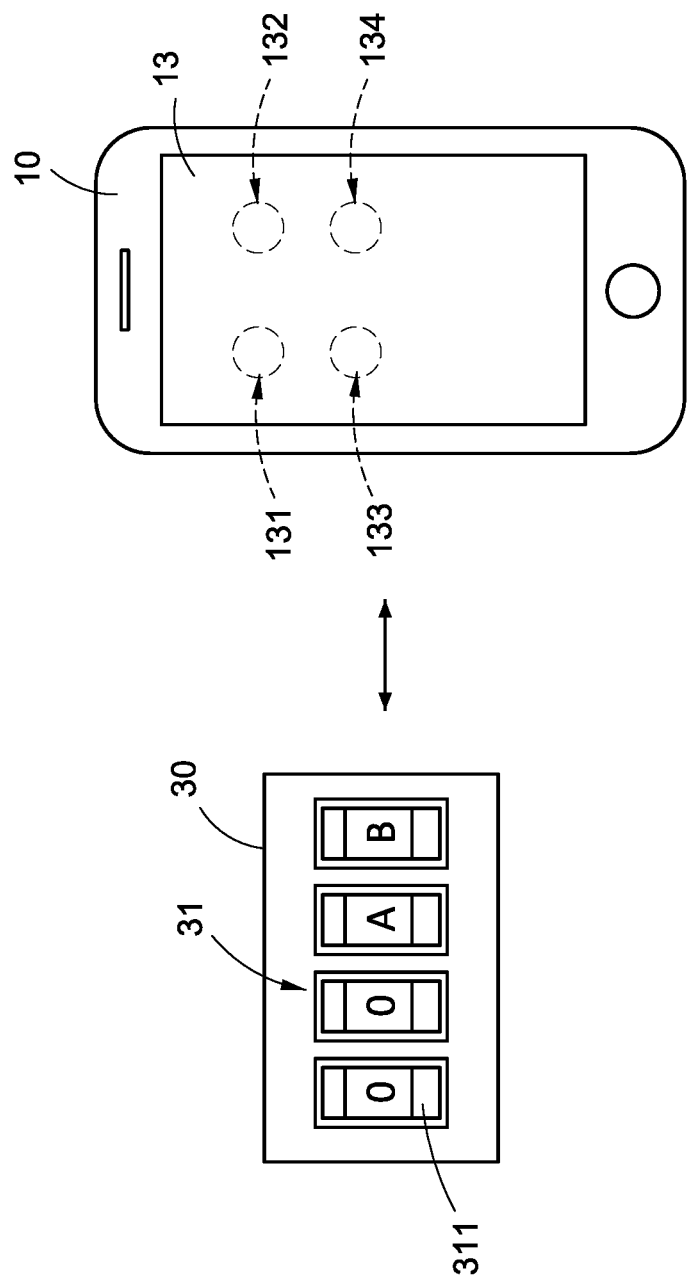
FIG. 2-4 are schematic structural diagrams of embodiments of the combination lock system of the present disclosure.
Figure 3:
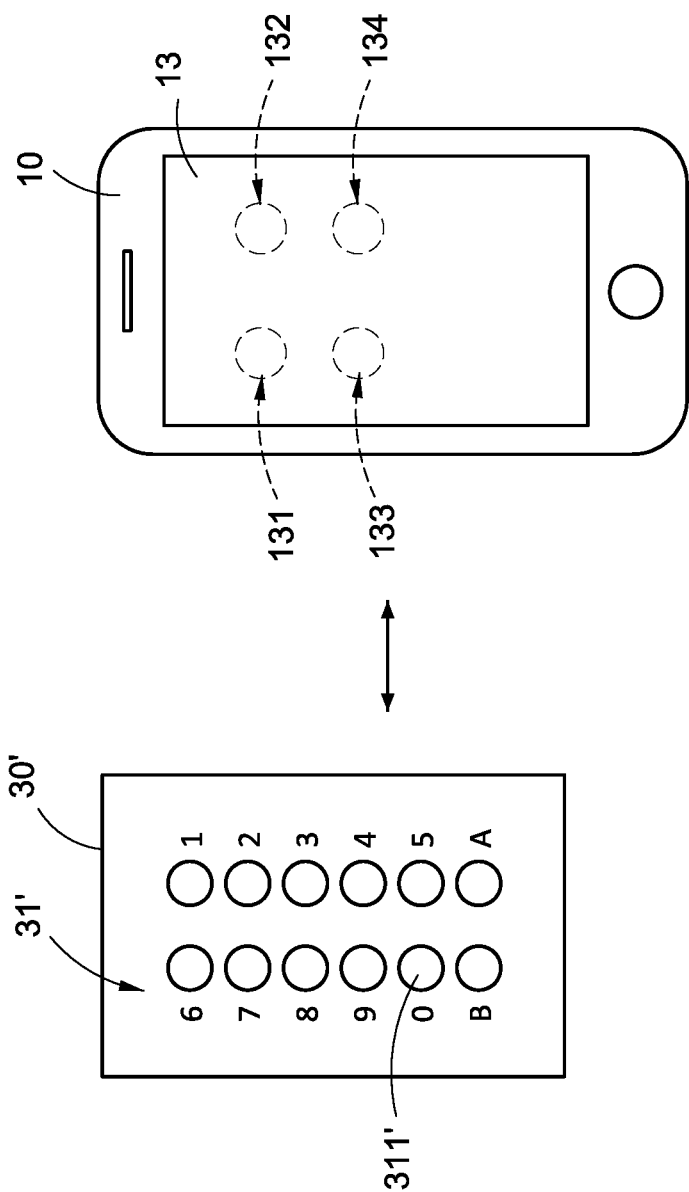
Figure 4:
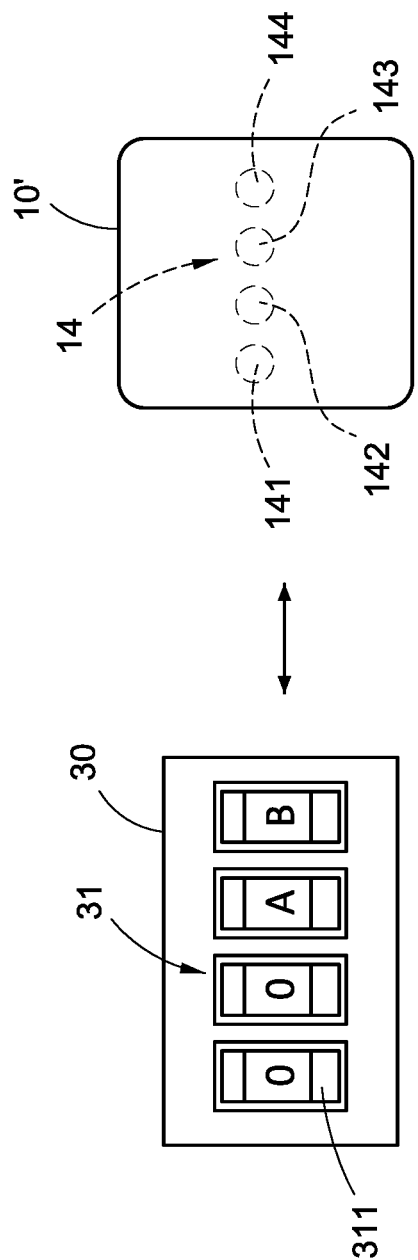

Please refer to FIG. 1-2. The FIG. 1 is an architecture diagram of a combination lock system of the present disclosure. The FIG. 2 is a schematic structural diagram of a first embodiment of the combination lock system of the present disclosure.

As shown in FIG. 1, in the first embodiment of the present disclosure, the combination lock system includes a mobile communication device 10, a cloud server 20 and a combination lock 30. The mobile communication device 10 stores first authentication information 11 and outputs a first near field communication (NFC) signal 100. The first near field communication signal 100 may be called as short-range communication or NFC. This communication protocol allows two electronic devices (there has usually a mobile device, for example, a smartphone) to communicate within a few centimeters of each other. The first authentication information 11 may be matched with the combination lock 30 and may be sold together. (For example, the first authentication information 11 may be obtained by scanning a hidden QR code, but the present disclosure is not limited thereto). Since different combination locks 30 can correspond to different first authentication information 11, it can be ensured that it is difficult for someone who to try to imitate other first authentication information 11 or other combination locks 30 to achieve the purpose of unlocking the combination lock.

The cloud server 20 stores second authentication information 21 and a plurality of password information 22, and receives the first authentication information 11 though a wireless network 300, when the cloud server 20 determines that the first authentication information 11 matches the second authentication information 21, the cloud server 20 outputted one of the plurality of password information 22 corresponding to the first authentication information 11 to the mobile communication device 10.

The combination lock 30 includes a password setting module 31 that adjustable, and the combination lock 30 obtains an electric energy and the password information 22 from the mobile communication device 10 through the first NFC signal 100. When the combination lock 30 determines that one of characters of the password setting module 31 matches one of characters of the password information 22 in a corresponding arrangement order, the combination lock 30 outputs display information (not shown) to the mobile communication device 10 through a second NFC signal 200, and the mobile communication device 10 displays the display information. When the combination lock 30 determines that one of the characters of the password setting module 31 does not match one of the characters of the password information 22 in the corresponding arrangement order, the combination lock 30 continues to determine whether one of the characters of the password setting module 31 matches one of the characters of the password information 22 in the corresponding arrangement order. After the combination lock 30 obtains the password information 22 from the mobile communication device 10 through the first NFC signal 100, regardless of the combination lock 30 determines whether the password setting module 31 matches the password information 22, the combination lock 30 outputs a combination lock record (not shown) to the mobile communication device 10 through the second NFC signal 200. Further, the combination lock record includes a time stamp, the password information 22, and a unique identifier (UID) or a random security identifier (RID) corresponding to the mobile communication device 10 for subsequent identity verification of tracing operation record.

The password setting module 31 may include one of a plurality of character wheels or a plurality of buttons or a combination thereof. In the first embodiment of the present disclosure, the password setting module 31 includes a plurality of numeral wheels, and the combination lock 30 further includes a microcontroller 32 and a general-purpose input/output unit (GPIO unit) 33 and an antenna 34. The microcontroller 32 is coupled to the password setting module 31 through the GPIO unit 33 to read the characters set by the password setting module 31, and the microcontroller 32 receives the power and password information 22 within the mobile communication device 10 by receiving the first NFC signal 100 through the antenna 34 (for example, an RFID antenna). The antenna 34 can be used to send a second NFC signal 200 to the mobile communication device 10. The electrical energy is used to maintain an operation of the microcontroller 32 and enable the microcontroller 32 to perform procedures such as modulation, demodulation, encryption or decryption on the first NFC signal 100 and the second NFC signal 200.

As shown in FIG. 2, in the first embodiment of the present disclosure, the password setting module 31 includes four wheel-shaped setting units 311, including two numeral wheels (set to 0, 0) and the other two numeral wheel (set to A, B), so the four characters are 0, 0, A, and B in sequence. The mobile communication device 10 may include a display screen 13 having a plurality of display areas 131, 132, 133, and 134. Each display area 131, 132, 133, and 134 corresponds to one of the characters of the password information 22. Each display area 131, 132, 133, 134 lights up when receiving the display information. In the first embodiment of the present disclosure, the four characters of the display areas 131, 132, 133, and 134 respectively corresponding to the password setting module 31 are 0, 0, A, and B in sequence. For example, if the first character of the password setting module 31 and the first character of the password information are both 0, the display area 131 lights up. When the second character of the password setting module 31 and the second character of the password information are both 0, the display area 132 lights up. When the third character of the password setting module 31 and the third character of the password information are both A, the display area 133 lights up. When the fourth character of the password setting module 31 and the fourth character of the password information are both B, the display area 134 lights up.

As shown in FIG. 1, in the first embodiment of the present disclosure, the mobile communication device 10 may include a storage module 12. If the mobile communication device 10 can wirelessly communicate with the cloud server 20 after receiving the combination lock record, the mobile communication device 10 outputs the combination lock record to the cloud server 20 through a wireless network 300. If the mobile communication device 10 cannot wirelessly communicate with the cloud server 20 after receiving the combination lock record, the mobile communication device 10 temporarily stores the combination lock record in a storage module 12 within the mobile communication device 10 until the mobile communication device determines that a wireless communication with the cloud server 20 is possible, and then the mobile communication device 10 outputs the combination lock record stored in the storage module 12 to the cloud server 20 through the wireless network 300. In the future, the combination lock record can be used to check.

Figure 5:
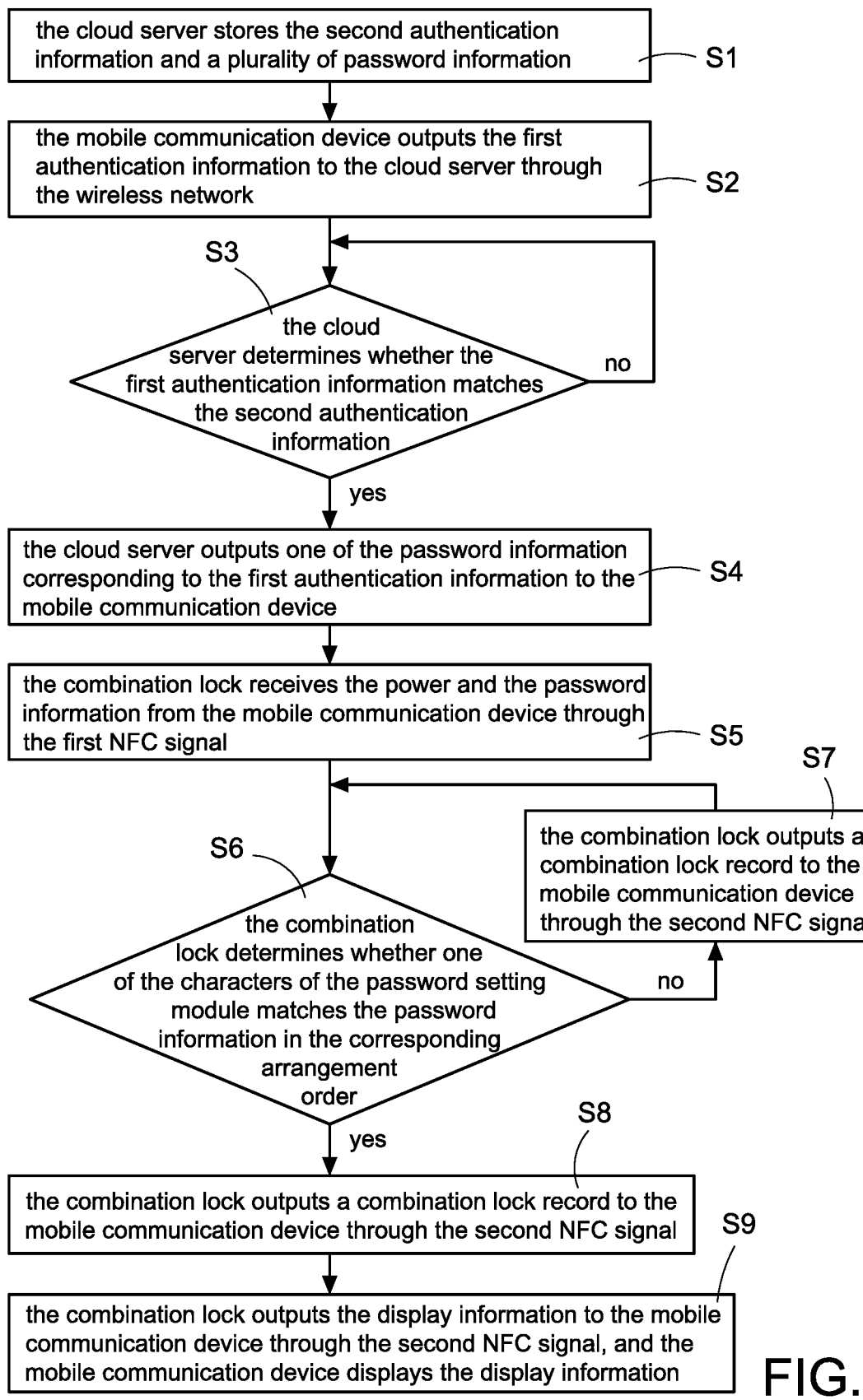
FIGS. 5 and 6 are flowcharts of a method of operating the combination lock system of the present disclosure.
Figure 6:
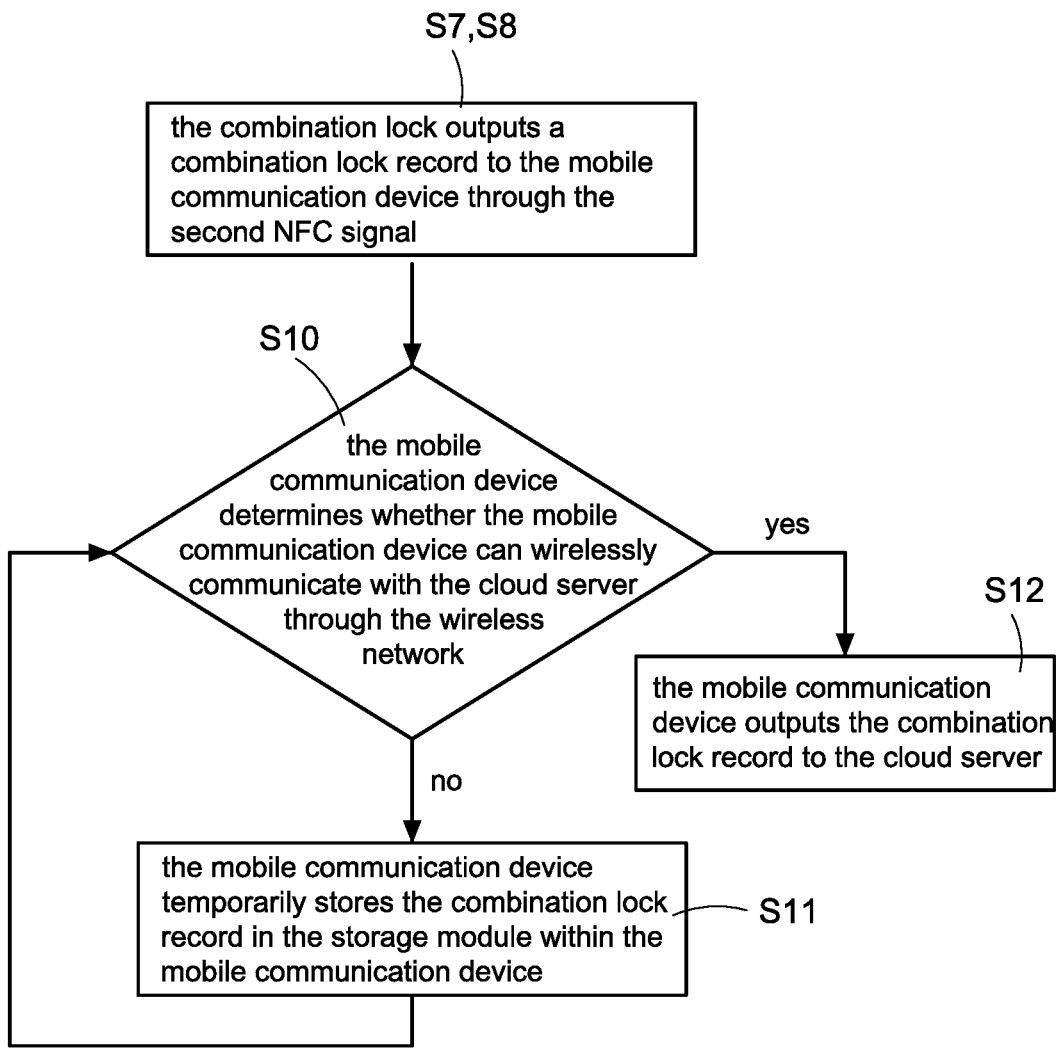

Please refer to FIG. 5 and FIG. 6, which are flowcharts of a method of operating the combination lock system of the present disclosure. The component symbols described below can be referred to FIG. 1 together. As shown in FIG. 5, when using the combination lock system according to the present disclosure, first of all, the cloud server 20 stores the second authentication information 21 and a plurality of password information 22 (step S1). And then, the mobile communication device 10 outputs the first authentication information 11 to the cloud server 20 through the wireless network 300 (step S2), and after receiving the first authentication information 11, the cloud server 20 determines whether the first authentication information 11 matches the second authentication information 21 (step S3). When the cloud server 20 determines that the first authentication information 11 matches the second authentication information 21, the cloud server 20 outputs one of the password information 22 corresponding to the first authentication information 11 to the mobile communication device 10 (step S4). When the cloud server 20 determines that the first authentication information 11 does not match the second authentication information 21, the cloud server 20 continues to the step S3. And then, the mobile communication device 10 approaches the combination lock 30 to transmit the NFC signal. At this time, the combination lock 30 receives the power and the password information 22 from the mobile communication device 10 through the first NFC signal 100 (step S5), and determines whether one of the characters of the password setting module 31 matches the password information 22 in the corresponding arrangement order (step S6). After the combination lock 30 obtains the password information from the mobile communication device 10 through the first NFC signal 100, regardless of the combination lock 30 determines whether the password setting module 31 matches the password information 22, the combination lock 30 outputs a combination lock record to the mobile communication device 10 through the second NFC signal 200 (step S7, step S8). The combination lock record includes a time stamp, the password information, and a UID corresponding to the mobile communication device 10. When the combination lock 30 determines that one of the characters of the combination setting module 31 matches one of the characters of the password information 22 of the corresponding arrangement order, the combination lock 30 outputs the display information to the mobile communication device 10 through the second NFC signal 200, and the mobile communication device 10 displays the display information (step S9).

Further, as shown in FIG. 6, after the combination lock 30 outputs the combination lock record to the mobile communication device 10 through the second NFC signal 200 (step S7, step S8), the mobile communication device 10 further determines whether the mobile communication device 10 can wirelessly communicate with the cloud server 20 through the wireless network 300 (step S10). If the mobile communication device 10 can wirelessly communicate with the cloud server 20 through the wireless network 300 after receiving the combination lock record, the mobile communication device 10 outputs the combination lock record to the cloud server 20 (step S12). If the mobile communication device 10 cannot wirelessly communicate with the cloud server 20 through the wireless network 300 after receiving the combination lock record, the mobile communication device 10 temporarily stores the combination lock record in the storage module 12 within the mobile communication device 10 (step S11), and return to step S10. Until the mobile communication device 10 determines that a wireless communication with the cloud server 20 is possible, the mobile communication device 10 outputs the combination lock record stored in the storage module 12 to the cloud server 20.

since the mobile communication device 10 must authenticate with the cloud server 20 according to the first authentication information outputted, and if the first authentication information 11 and the combination lock 30 are matched and can be sold together, so it can ensure that it is difficult for someone to try to imitate other first authentication information 11 or other combination locks 30 to achieve a purpose of unlocking the combination lock 30. Further, when user forgets the password set by own and cannot successfully unlock the combination lock 30, the combination lock 30 can be unlocked non-intrusively by the password information 22 obtained after the mobile communication device 10 is authenticated and the password setting module 31 of the combination lock 30. There is no need additional physical key and no need to destroy the combination locks 30. If the combination locks 30 determines one of the characters of the password setting module 31 matches one of the characters of the password information 22 in the corresponding arrangement order, the combination lock 30 outputs the display information to the mobile communication device 10, and the mobile communication device 10 displays the display information, and the user can know that the current characters match. In addition, regardless of whether the combination lock 30 is successfully unlocked (regardless of whether the password setting module 31 matches the password information 22), the combination lock 30 outputs the combination lock record to the mobile communication device 10. In case of malicious trial and error or malicious unlock by someone, it can be tracked by the combination lock record.

For this reason, the combination lock system that solves the technical problem about in prior art there is no other secure and non-intrusive method to unlock the combination lock 30 when the password set by own is forgotten, and regardless of whether the combination lock 30 is successfully unlocked, there has a record to achieve a purpose of convenience and enhance the safety of the combination lock 30.

The above is only a detailed description and drawings of the preferred embodiments of the present disclosure, but the features of the present disclosure are not limited thereto, and are not intended to limit the present disclosure. All the scope of the present disclosure shall be subject to the scope of the following claims. The embodiments of the spirit of the present disclosure and its similar variations are intended to be included in the scope of the present disclosure. Any variation or modification that can be easily conceived by those skilled in the art in the field of the present disclosure can be covered by the following claims.

What is claimed is:

1. A method of operating a combination lock system, comprising following steps of:

storing, by a cloud server (20), second authentication information (21) and a plurality of password information (22), outputting, by a mobile communication device (10, 10'), first authentication information (11) to the cloud server (20), outputting, by the cloud server (20), one of the plurality of the password information (22) corresponding to the first authentication information (11) to the mobile communication device (10, 10') when the cloud server (20) determined that the first authentication information (11) matches the second authentication information (21), obtaining, by a combination lock (30, 30'), an electric energy and the password information (22) from the mobile communication device (10, 10') through a first near field communication (NFC) signal, and outputting, by the combination lock (30, 30'), a display information to the mobile communication device (10, 10') through a second NFC signal (200) when the combination lock (30, 30') determined that one of characters of the password setting module (31, 31') matches one of characters of the password information (22) in a corresponding arrangement order, and meanwhile the mobile communication device (10, 10') configured to display the display information, wherein after the combination lock (30, 30') is configured to obtain the password information (22) from the mobile communication device (10, 10') through the first NFC signal (100), regardless of the combination lock (30, 30') determines whether the password setting module (31, 31') matches the password information (22), the combination lock (30, 30') is configured to output a combination lock record to the mobile communication device (10, 10') through the second NFC signal (200), the combination lock record includes a time stamp, the password information (22), and a unique identifier (UID) corresponding to the mobile communication device (10, 10').

2. The method of operating the combination lock system in claim 1, wherein the mobile communication device (10, 10') includes a display screen (13) and a plurality of LEDs (14), the display screen (13) has a plurality of display areas (131~134), each of the display areas (131~134) corresponds to one of the characters of the password information (22), and each of the display areas (131~134) is configured to light up when the display information is received.

3. The method of operating the combination lock system in claim 1, wherein if the mobile communication device (10, 10') can wirelessly communicate with the cloud server (20) after receiving the combination lock record, the mobile communication device (10, 10') is configured to output the combination lock record to the cloud server (20), or if the mobile communication device (10, 10') cannot wirelessly communicate with the cloud server (20) after receiving the combination lock record, the mobile communication device (10, 10') is configured to temporarily store the combination lock record in a storage module (12) within the mobile communication device (10, 10') until the mobile communication device (10, 10') determines that a wireless communication with the cloud server (20) is possible, and then the mobile communication device (10, 10') is configured to output the combination lock record stored in the storage module (12) to the cloud server (20).

* * * * *